United States Patent

Lindberg et al.

[11] Patent Number: 6,088,329
[45] Date of Patent: Jul. 11, 2000

[54] FAULT TOLERANT SUBRATE SWITCHING

[75] Inventors: Lars Olof Mikael Lindberg, Täby; Jonas Bjurel, Bromma; Lennart Roland Ingemar Habbe, Gnesta, all of Sweden

[73] Assignee: Telefonaktiebolaget LM Ericsson, Stockholm, Sweden

[21] Appl. No.: 08/989,001

[22] Filed: Dec. 11, 1997

[51] Int. Cl.[7] ............................ G06F 11/00; H04Q 11/00; H02H 3/05
[52] U.S. Cl. .......................... 370/217; 370/220; 370/387; 714/4; 709/239
[58] Field of Search ................................. 370/216, 217, 370/218, 219, 220, 387, 352, 356, 329, 337; 714/1–12; 709/239

[56] References Cited

U.S. PATENT DOCUMENTS

| | | | |
|---|---|---|---|
| 3,912,873 | 10/1975 | Skaperda | 370/217 |
| 4,654,842 | 3/1987 | Coraluppi et al. | 370/217 |
| 4,658,396 | 4/1987 | Barden | 370/226 |
| 4,695,999 | 9/1987 | Lebizay | 370/217 |
| 4,771,420 | 9/1988 | Deschaine et al. | 370/376 |
| 4,847,837 | 7/1989 | Morales et al. | 714/4 |
| 5,453,985 | 9/1995 | Ghisler | 370/358 |
| 5,471,460 | 11/1995 | Tanabe | 370/218 |
| 5,491,696 | 2/1996 | Nishimura | 370/225 |
| 5,596,569 | 1/1997 | Madonna et al. | 370/217 |
| 5,666,483 | 9/1997 | McClary | 370/220 |
| 5,671,215 | 9/1997 | Foglar | 370/217 |
| 5,848,227 | 12/1998 | Sheu | 714/4 |
| 5,923,830 | 7/1999 | Fuchs et al. | 714/11 |

FOREIGN PATENT DOCUMENTS

| | | |
|---|---|---|
| 0039077A1 | 11/1981 | European Pat. Off. . |
| 0321426A1 | 6/1989 | European Pat. Off. . |
| 0418475A2 | 3/1991 | European Pat. Off. . |
| WO 97/09839 | 3/1997 | WIPO . |
| WO 97/13390 | 4/1997 | WIPO . |
| WO 97/27720 | 7/1997 | WIPO . |

OTHER PUBLICATIONS

Masato Tokunaga, "Advanced Multimedia Time–Division Multiplexer", Japan Telecommunication Review, vol. 30, No. 3, Jul. 1988, pp. 42–50.

*Primary Examiner*—Alpus H. Hsu
*Assistant Examiner*—Afsar M. Qureshi
*Attorney, Agent, or Firm*—Burns, Doane, Swecker & Mathis, L.L.P.

[57] ABSTRACT

A plurality of input signals are switched in an apparatus including redundant switching planes and hardware for receiving an output signal from each of the redundant switching planes. Each switching plane is for switching the plurality of input signals, and each switching plane includes at least two switching modules, each switching module being connected to receive a subset of the input signals directly from an input signal source coupled to the apparatus. Each switching module is further connected to receive a remaining subset of the input signals from remaining switching modules on the same switching plane; and each switching module generates an output signal having components selected from the plurality of input signals. To improve performance in the event of a double fault, each switching module detects whether any of the remaining switching modules on the same switching plane are faulty. In response to any such detection, the switching module substitutes a signal representing a logical zero for those portions of the output signal that are selected to include one or more components from the faulty switching module. Also, when the means for receiving the output signal from each of the redundant switching planes detects that each of the output signals received from corresponding switching modules in the redundant switching planes is invalid; it responds by logically OR'ing the received output signals together. In this way, the likelihood of recovering a valid output signal is increased. In one embodiment of the invention, each switching module is a subrate switching module.

56 Claims, 9 Drawing Sheets

FAULT TOLERANT SUBRATE SWITCHING

BACKGROUND

The present invention relates to subrate switching, and more particularly to techniques for achieving fault tolerance in subrate switches.

Because of the ever-increasing demand for telecommunications services, it is vital that a telecommunications system use its resources in an efficient manner. Inefficiencies can result, for example, by allocating a resource to one user who cannot utilize the full capacity of that resource. One well-known approach to alleviating this type of problem is to utilize Time Division Multiple Access (TDMA) techniques. Such techniques permit a plurality of users to share a single transmission medium. Essentially, the medium is divided up into a series of time slots, each of which can potentially be assigned to a different user. Thus, a first user might transmit information via the transmission medium during a first time slot, a second user might transmit information during a second time slot, and so on. In order to implement such a system, a so-called "normal rate switch" may be used. In telecommunication systems such as the Global System for Mobile communication (GSM), normal rate switching works at a transfer rate of 64 Kbit/s. The normal rate switch has a plurality of inputs, each coupled to receive information from a respective one of the users. The normal rate switch also has a plurality of outputs, each one corresponding to a particular time slot in the TDMA frame. The normal rate switch is capable of switching the information from any one of its inputs to any of its outputs (time slots). In this way, a TDMA frame may be composed from the data supplied by the various users. TDMA techniques are well known, and a complete discussion of them would go well beyond the scope of this disclosure.

Another way in which telecommunication system designers have been able to make more efficient use of system capacity is by decreasing the number of bits that it takes to encode the same piece of information. For example, in digital mobile telephony, speech information is coded by a speech coder in such a way that a lower transfer rate over the radio connection is obtained. In GSM, for example, so-called "full rate" speech coding is capable of achieving a transfer rate of less than 16 kbit/s. This is one fourth of the normal Pulse Code Modulation (PCM) transmission rate that is employed by GSM. In this case, one channel occupies only two bits in an 8-bit PCM word. In order to prevent the remaining bits from being unused, it has therefore been suggested that four such coded channels be packed into a PCM word that is sent to the public telephone network. This packing can, for instance, be done in a base station controller (BSC).

The packing of such coded channels into a PCM word is efficient only so long as each bit of the coded information is conveying information. However, this may not always be the case. For example, so-called "half rate" channels have been defined that have a transfer rate of less than 8 kbit/s. Such channels require only one of the eight bits in a PCM word. In this case, it is desirable to pack several "half rate" channels in one and the same PCM word. Traditional telecommunications systems perform switching at a normal rate. However, when full or half rate information is supplied at an input of the normal rate switch, it leaves a number of input bits unused. This means that some of the bits appearing at the output of the normal rate switch will not convey any information, thereby constituting a waste of system resources.

Figure 1:
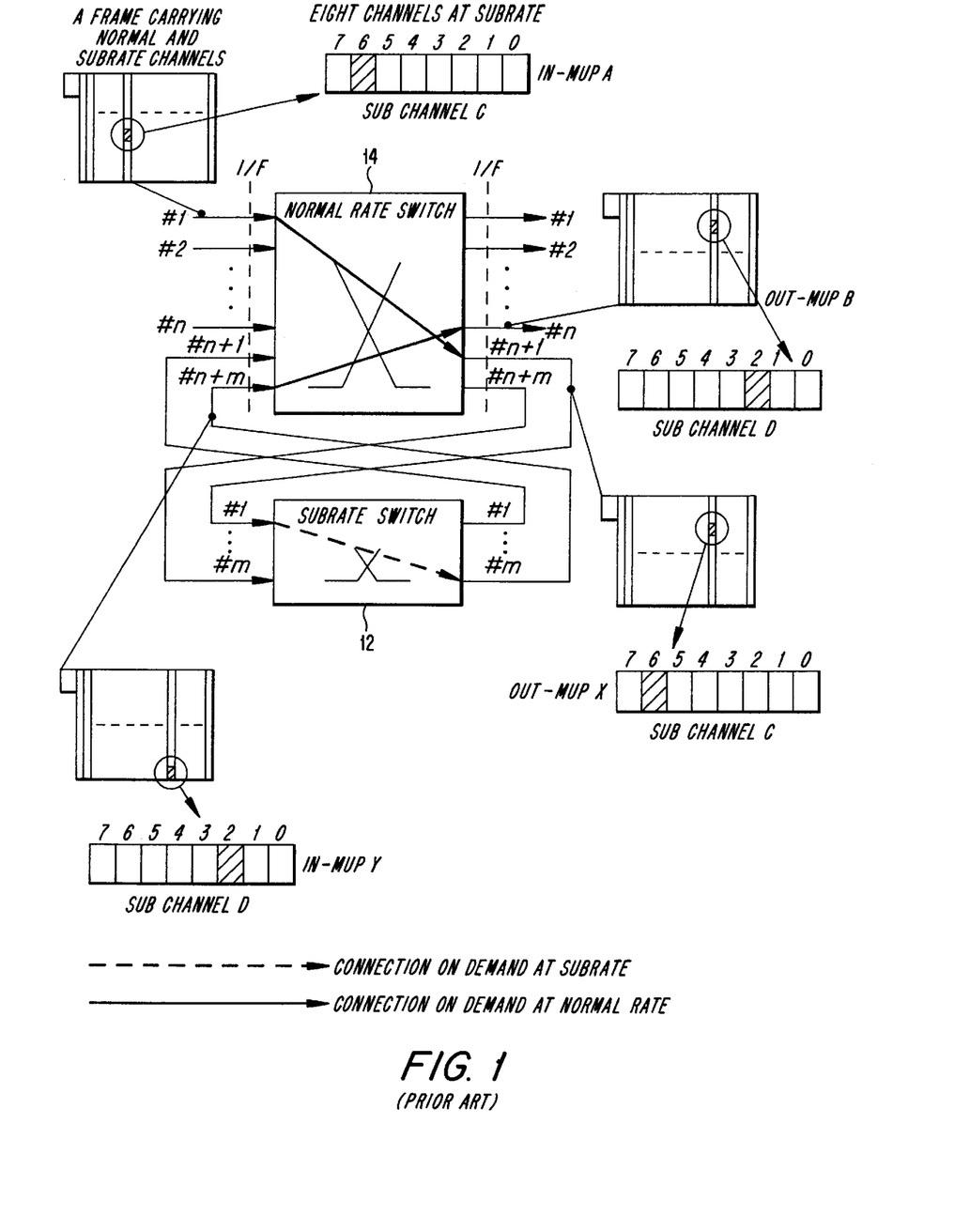
FIG. 1 is a block diagram of a prior art switching system that includes a subrate switch used in conjunction with a normal rate switch.

In view of the above, so-called "subrate" switching has been proposed in which traffic is circuit switched on a bit level instead of a byte level. In order to permit the intermixing of, for example, full rate and half rate channels, subrate switching is usually performed by connecting the output of a normal switch to the input of a subrate switch, with a feedback connection from the subrate switch back to an input of the normal switch. Such an arrangement is depicted in FIG. 1, and described, for example, in U.S. Pat. No. 5,453,985, which issued to Ghisler on Sep. 26, 1995, and which is hereby incorporated herein by reference.

In FIG. 1, traffic is depicted flowing in one direction (from the left to the right). Of course, those skilled in the art will appreciate that traffic typically flows in both directions. A first group of traffic interface ports (#1 to n) of the normal rate switch 14 is allocated for traditional normal rate traffic. A second set of traffic interface ports of the normal rate switch 14, (#n+1) through (#n+m), is allocated for routing subrate traffic between the normal rate switch 14 and the subrate switch 12. The subrate switch 12 includes a plurality of incoming and outgoing interface ports (#1 to m). Accordingly, the subrate switch 12 is only connected to the normal rate switch and does not interface with external telecommunications equipment. This further enhances its modularity and minimizes its impact on existing equipment.

Although this is not depicted in FIG. 1, normal rate channels may be switched through the normal rate switch 14 from, for example, an in-MUP A (where "MUP" denotes "Multiple Position node") carried by the frame terminated at port #1 to, for example, an out-MUP B carried by the frame terminated at port #n. The illustrated frames can be either Synchronous Digital Hierarchy (SDH)-, SONET, or Plesiochronous Digital Hierarchy (PDH)-type frames.

The depicted example shows connection of a subrate channel C to a subrate channel D at a rate corresponding to one-eighth of the normal rate. In other words, subrate channel C corresponds to one bit at bit location 6 in the time slot that is switched ultimately to bit position 2 in the time slot out-MUP B. Thus, the normal rate time slot that contains subrate channel C received at in-MUP A (at port #1) is routed through normal rate switch 14 to out-MPU X (at port #n+1). Note that subchannel C remains at bit location 6. The time slot including subchannel C is then routed to port #1 of subrate switch 12 which performs the subrate switching, that is, switching subchannel C at bit location 6 in the incoming time slot to subchannel D at bit position 2 in a different outgoing time slot. The outgoing time slot including subchannel D is routed from subrate switch port #m to incoming MUP Y (at port #n+m) of the normal rate switch 14 and is then routed through the normal rate switch to outgoing MUP B (at port #n).

Figure 2:
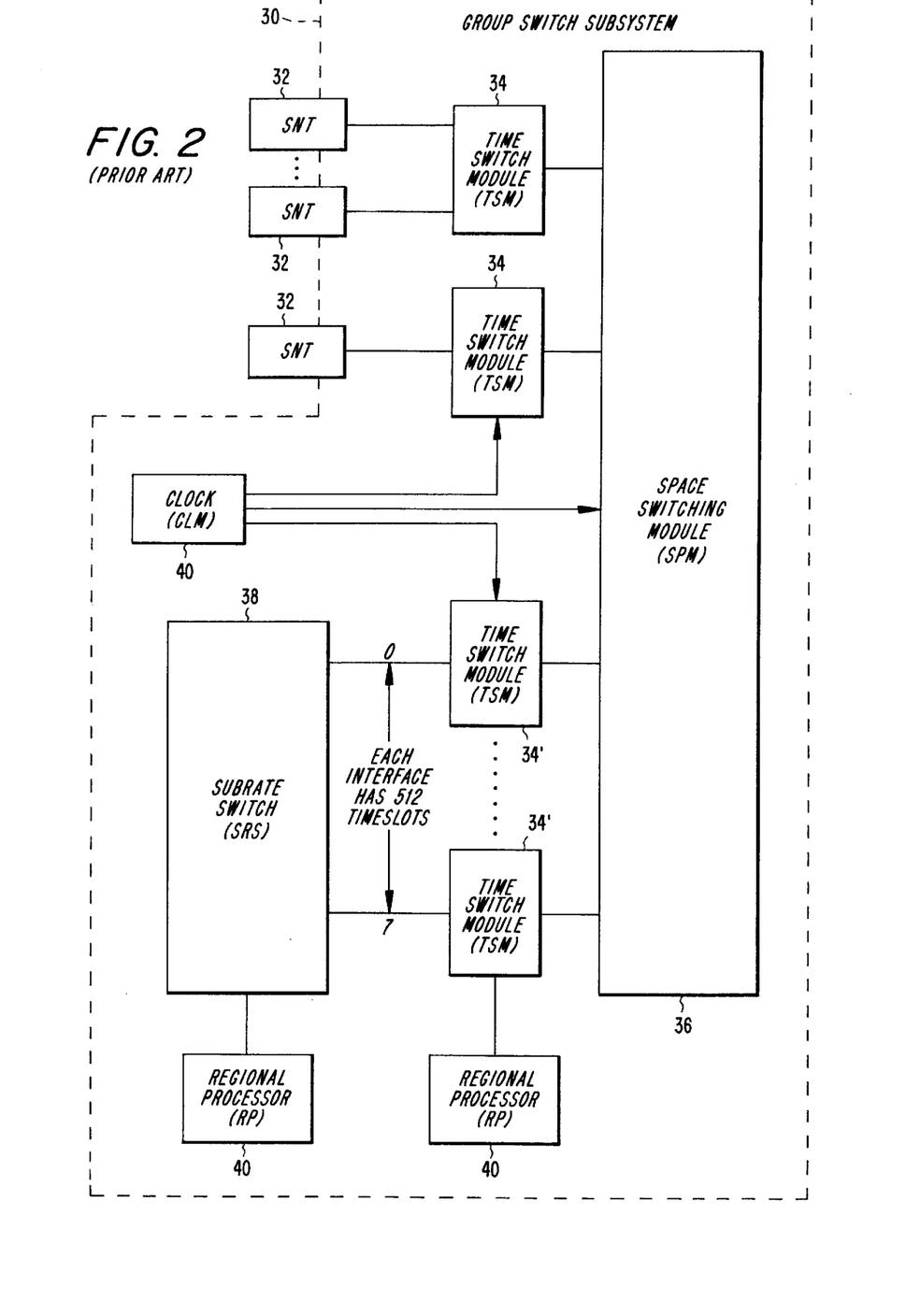
FIG. 2, is a block diagram of prior art subrate switch module units that are modular add-on switches to an existing telecommunications switch.

Referring now to FIG. 2, subrate switch module units of the type described above will now be described as a modular add-on switch to an existing telecommunications switch, namely, the group switch subsystem (GSS) of the well known Ericsson AXE-10 telecommunications switching system. The group switch subsystem 30 employs a time-space-time (TST) switch architecture. Incoming and outgoing calls are interfaced to the group switch subsystem through switching network terminals (SNTs). Input switching network terminals 32 are connected to an incoming time switch module (TSM) 34. The time switch modules 34 are connected to a space switching module (SPM) 36. The subrate switch 38 is also interfaced with the space switching module 36 via time switch modules 34'. A clock module 40 synchronizes the timing of all modules in the group switch subsystem 30. A central processor (not shown) and regional processors 40, maintain a database map of system configurations for the different types of equipment connected to the switch and the different types of channels at switch interfaces. Using this database information, the processors control the operation and routing of switching paths through the group switch subsystem 30.

More particularly, the subrate switch 38 is connected to the normal rate group switch by eight (0–7) TSMs 34'. Each TSM 34' interface includes 512 time slots. As described above, each bit of each outgoing time slot in the subrate switch module corresponds to one location in a subrate switch module control store. Thus, the contents of each control store location defines a specific bit in a switch store (SS) to be read. In order to connect a channel of more than 8 kbps, the regional processors 40 must write addresses in more than one control store location. For example, to set up a 24 kbps connection (3 bits of a normal rate 8-bit time slot), requires that three addresses must be written in control stores (i.e., one control store location per bit).

The actual detailed architecture and operation of the group switch subsystem is known and not repeated here. In brief, the time switch modules (TSMs) implement time switching, and the space switch module (SPM) implements space switching. The TSMs handle the transmission and reception of speech samples using various switch stores. Speech samples are written into an incoming speech store in a fixed order, but when those samples are read out, the order is determined by addresses in a control store. The time switch modules also have an additional control store which is used to control the operation of electronic gates in the space switch module (SPM) to selectively transfer speech and data through the group switch. In essence, this space switch control store is used to connect incoming and outgoing TSMs.

Figure 3:
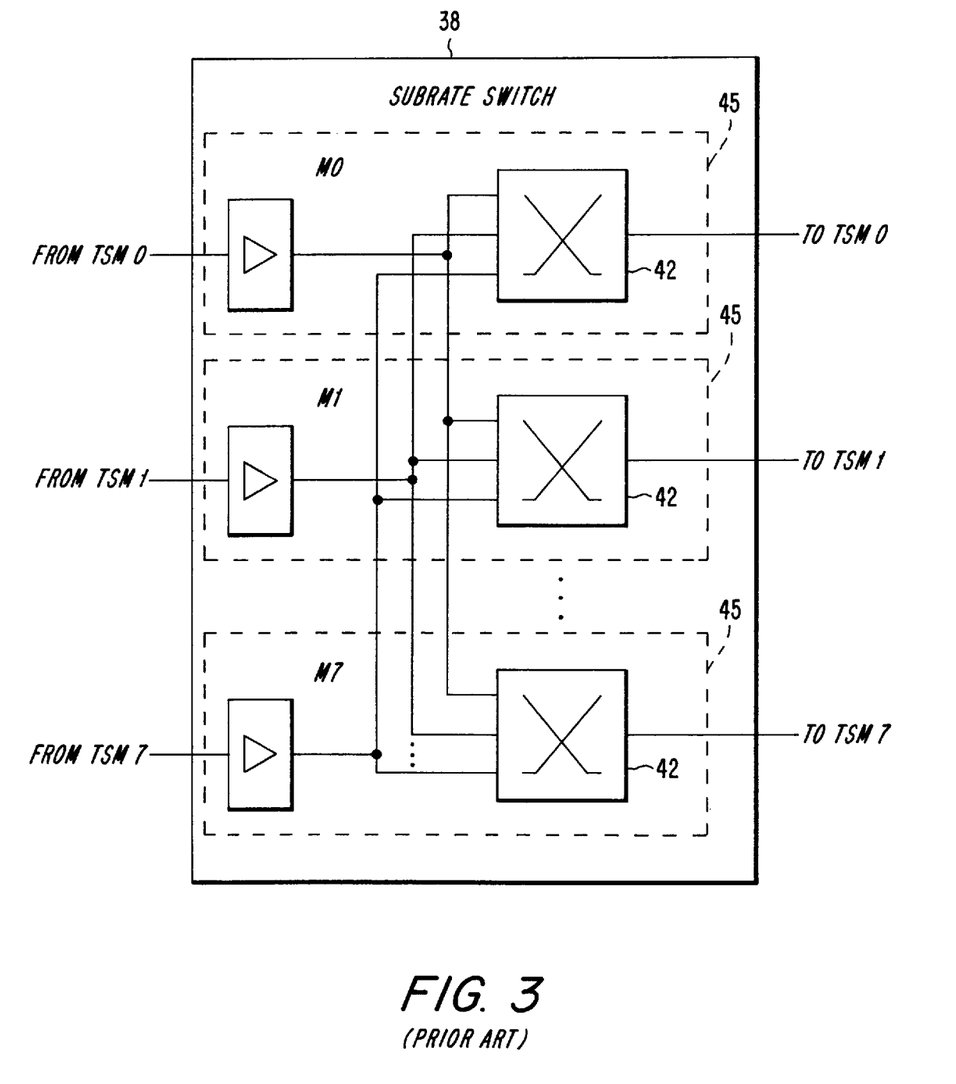
FIG. 3 is a block diagram of a prior art subrate switch.

FIG. 3 shows one particular implementation of a subrate switch module architecture in this group switch embodiment. In order to provide convenient implementation and maintenance of the subrate switch 38 in the group switch subsystem 30, the subrate switch 38 may be partitioned into units corresponding to the size of a time switch module (TSM). A number of partitioned subrate switch modules 45 correspond, for example, to a subrate switch 12, as depicted in FIG. 1. Each subrate switch module 45 includes an outlet going to only one time switching module (TSM). Moreover, each subrate switch module 45 includes inlets from TSMs 34' connected to the subrate switch (SRS) 38.

The procedure for setting up and releasing a two-way subrate connection on demand in this group switch subsystem (GSS) embodiment will now be described. An "on-demand" subrate connection is initiated by the generation of a subrate path signal from the GSS user. That signal contains data relating to the incoming GSS-MUP, the incoming subchannel position, the outgoing subchannel position, and the outgoing GSS-MUP. Data related to subchannel position also identify the particular rate of the subrate connection required.

Upon receiving the subrate connection command, the central/regional processors establish the three paths that constitute a subrate connection: the incoming carrier, outgoing carrier, and subrate switch path. Of course, the incoming and outgoing carriers may be established as on-demand connections or as semi-permanent connections. The release of the subrate two-way connection is ordered by the GSS-user; the release signal contains the in-MUP and the subchannel position in the in-MUP. Once received, the subrate connection in the subrate switch is released. The two carrier connections are released if no other subrate connections exist on them.

The above description addresses the components and techniques that are utilized to accomplish the switching that must be performed in an exemplary telecommunications system. However, it is typically additionally necessary to include redundancy of components in the switching system in order to achieve the desired quality of service. That is, for each component whose failure rate exceeds requirements, a redundant component is provided that operates in parallel with the first component. With this arrangement, a failed component can electronically be switched out and replaced by its still-functioning "twin", thereby maintaining a quality of service.

Figure 4:
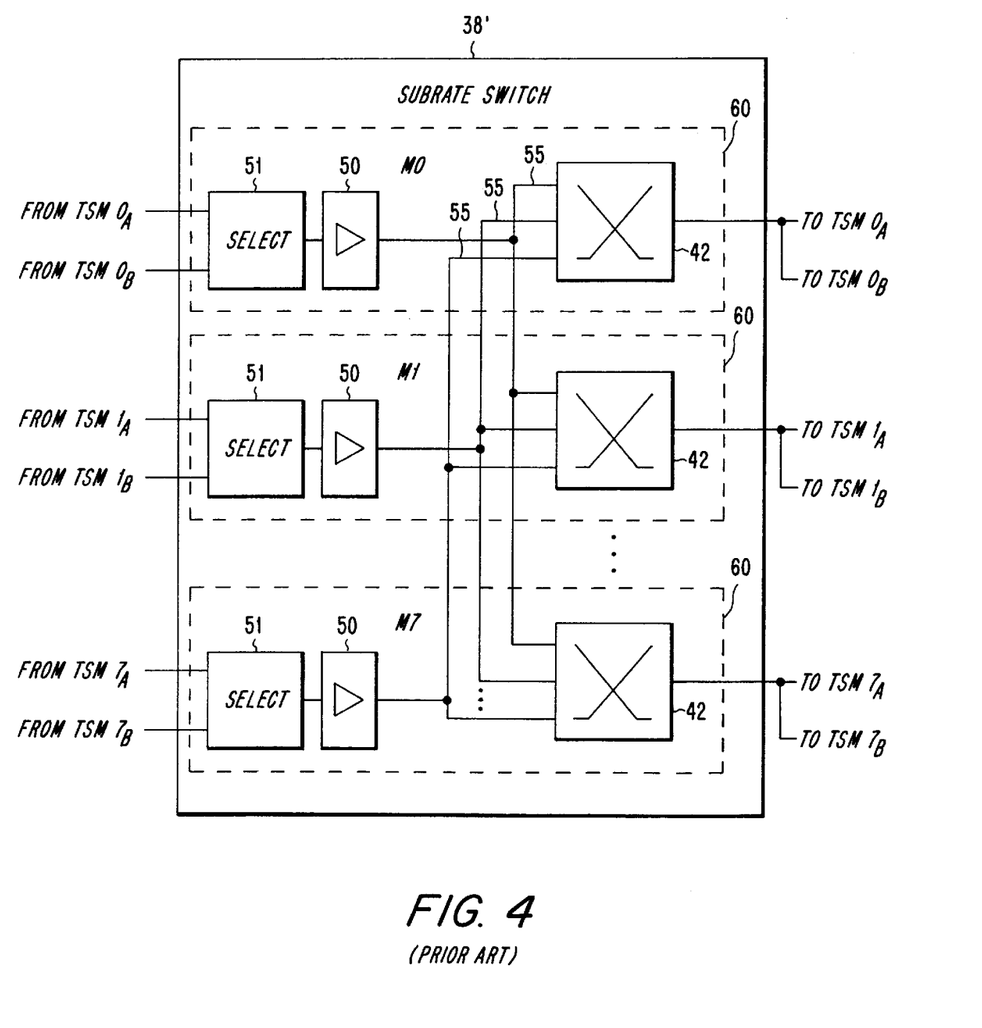
FIG. 4 is a block diagram of a prior art subrate switch for use in redundant switching planes.

For example, each of the subrate switch 38, the time switch modules 34, 34', and the space switching module 36 depicted in FIG. 2 may be duplicated by one or more redundant modules operating in parallel. To accommodate this redundancy, each of the modules must be designed to accept inputs from each "plane" of redundant components, and must also be designed to distribute its output signals to a plane of redundant components. For example, consider the case in which each of the TSMs 34' has a redundant component, and that the pair of components are denoted $TSMx_A$ and $TSMx_B$ (where, in this example, the "x" may be any number from zero to seven in correspondence with one of the eight TSMs 34' depicted in FIG. 2). To accommodate this redundancy, the subrate switch 38 might be modified as shown in FIG. 4. The modified subrate switch 38' comprises a number of subrate switching modules 60, individually denoted M0 . . . M7. Each subrate switching module Mx 60 comprises a selector 51, a driver 50 and a subrate switch matrix 42. In the modified subrate switching module 38', the outputs from each subrate switch matrix 42 must be supplied to each TSM plane (i.e., to each of the units $TSMx_A$ 34' and $TSMx_B$ 34'). Additionally, each driver 50 now receives its input from the selector 51 that supplies at its output a selected one of its inputs, either $TSMx_A$ or $TSMx_B$. For simplicity, a controller for the selector is not depicted in the figure. Those having ordinary skill in the art will recognize that any such controller would generate its control signal as a function of which of the TSMs is operating normally.

Figure 5:
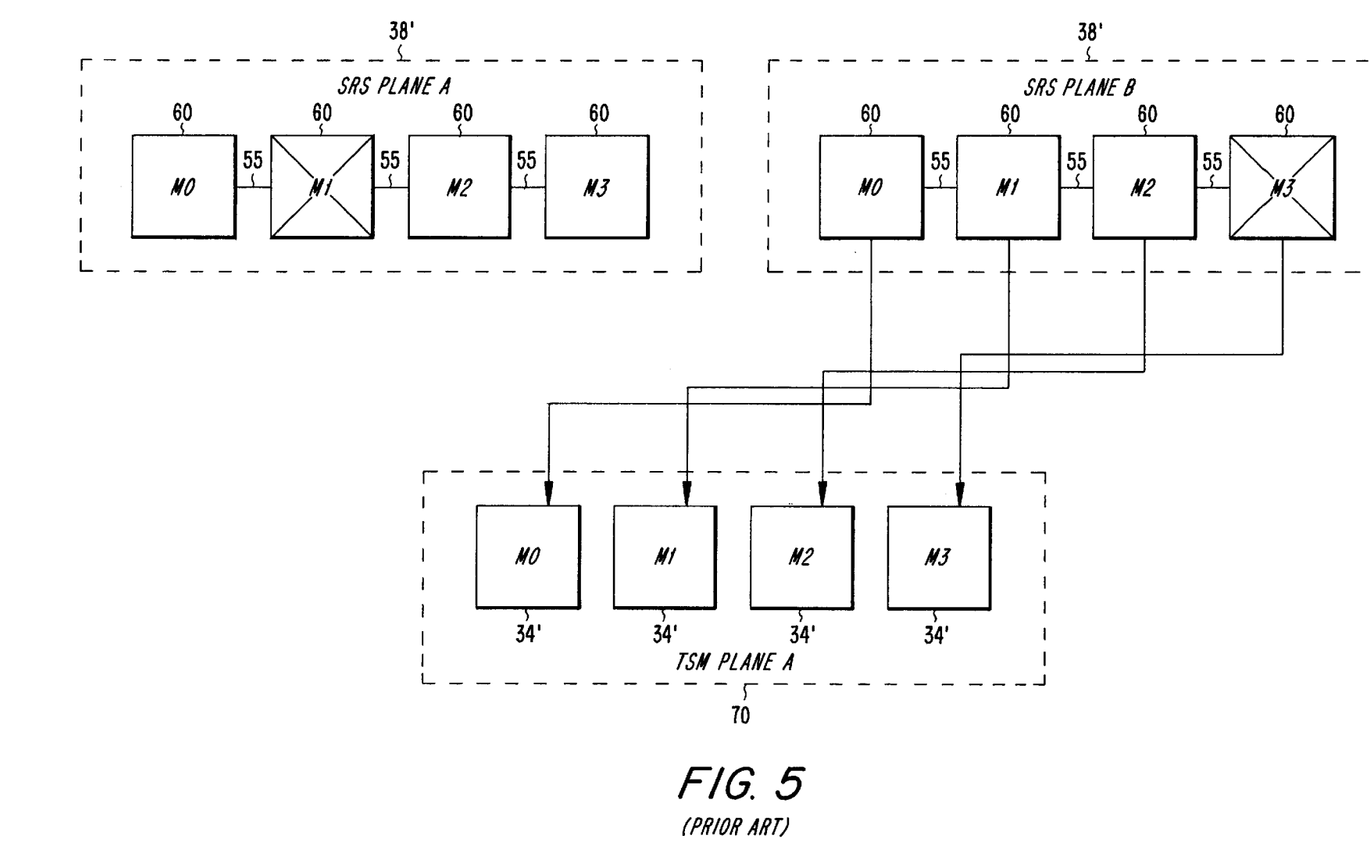
FIG. 5 illustrates a prior art solution for handling errors that occur in redundant switching planes.

Now consider an aspect of the design related to the fact that in the switching system, each of the SRS's 38' will also be replicated. In FIG. 5, two SRS planes 38' are shown, respectively designated "A" and "B". In order to simplify the following discussion, only one TSM plane 70 is shown, although the switching system may include redundant TSM planes 70 as described previously. In order to further simplify the discussion, it will now be assumed that each SRS 38' has only four subrate switching modules 60 (designated M0, M1, M2 and M3) instead of the eight shown in FIG. 4. The TSM plane 70 will also be assumed to have four TSMs 34' internally, for receiving the respective outputs from corresponding subrate switching modules 60 inside the SRS 38'. Although, in FIG. 5, each of the internal connections 55 within each SRS 38' is depicted connecting only adjacent subrate switching modules 60, in reality it designates a connection from the input of one subrate switching module 60 to each of the other subrate switching modules 60 in the SRS 38', as fully shown in FIG. 4.

Conventionally, if a fault occurs in a subrate switching module 60, for example M1 in SRS plane A, then plane A is taken down completely and only SRS plane B is used. This is schematically depicted in FIG. 5 by means of the absence of any indicated connection between SRS plane A and TSM plane A. If plane B then experiences a fault in one of its subrate switching modules 60, such as M3, then a double fault situation has occurred, permitting SRS plane B to maintain traffic only between subrate switching modules M0 and M1, between M0 and M2, and between M1 and M2. (Traffic in SRS plane A is not considered here, because this module was previously shut down.) Thus, in SRS plane B, all traffic between M0 and M3, between M1 and M3, and between M2 and M3 is negatively affected.

In view of the above, it is desirable to provide components in a switching system that are capable of operating correctly even after a double fault, as described above, occurs.

SUMMARY

It is therefore an object of the present invention to provide an improved processing module, including an improved switching module, for use with a redundant processing module, wherein the improved processing module generates an output that facilitates recovery of valid processed data in the event of a double fault.

It is a further object of the present invention to provide a processing system, including a switching system, that is capable of recovering valid data even when redundant components are generating invalid processed data output signals.

In accordance with one aspect of the present invention, the foregoing and other objects are achieved in processing modules for use in an apparatus for processing a plurality of input signals, wherein the apparatus comprises redundant processing planes, wherein each processing plane is for processing the plurality of input signals, and each processing plane includes at least two of the processing modules, each processing module being connected to receive a subset of the input signals directly from an input signal source coupled to the apparatus and each processing module being further connected to receive a remaining subset of the input signals from remaining processing modules on the same processing plane; and wherein each processing module generates an output signal comprising components selected from the plurality of input signals. The processing module detects whether any of the remaining processing modules on the same processing plane are faulty; and if so, it substitutes a signal representing, in one embodiment, a logical zero for those portions of the output signal that are selected to include one or more components from the faulty processing module. The output of this processing module facilitates the recovery of valid data when redundant processing modules are each generating invalid data.

In another aspect of the invention, the processing performed by each of the modules is switching.

In another aspect of the invention, the apparatus further includes hardware for receiving an output signal from each of the redundant processing planes. When the means for receiving the output signal from each of the redundant processing planes detects that each of the output signals received from corresponding processing modules in the redundant processing planes is invalid; it responds by, in one embodiment, logically OR'ing the received output signals together. In this way, the likelihood of recovering a valid output signal is increased. In one embodiment of the invention in which the processing is switching, each processing module is a subrate switching module. In alternative embodiments, the inventive concepts may be applied to other types of switching, and other types of processing as well.

In alternative embodiments, the counterpart steps of setting to logical zero and logically OR'ing are replaced by other counterpart logical operations, such as setting to logical one combined with logically AND'ing.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

In accordance with one aspect of the invention, greater fault tolerance in a double fault situation is achieved by permitting redundant faulty modules to continue to generate data in only those bit positions in which valid data can be generated. In another aspect, such data from a plurality of faulty modules is combined to generate as many valid bit positions as possible. This concept will now be described in greater detail.

Figure 6:
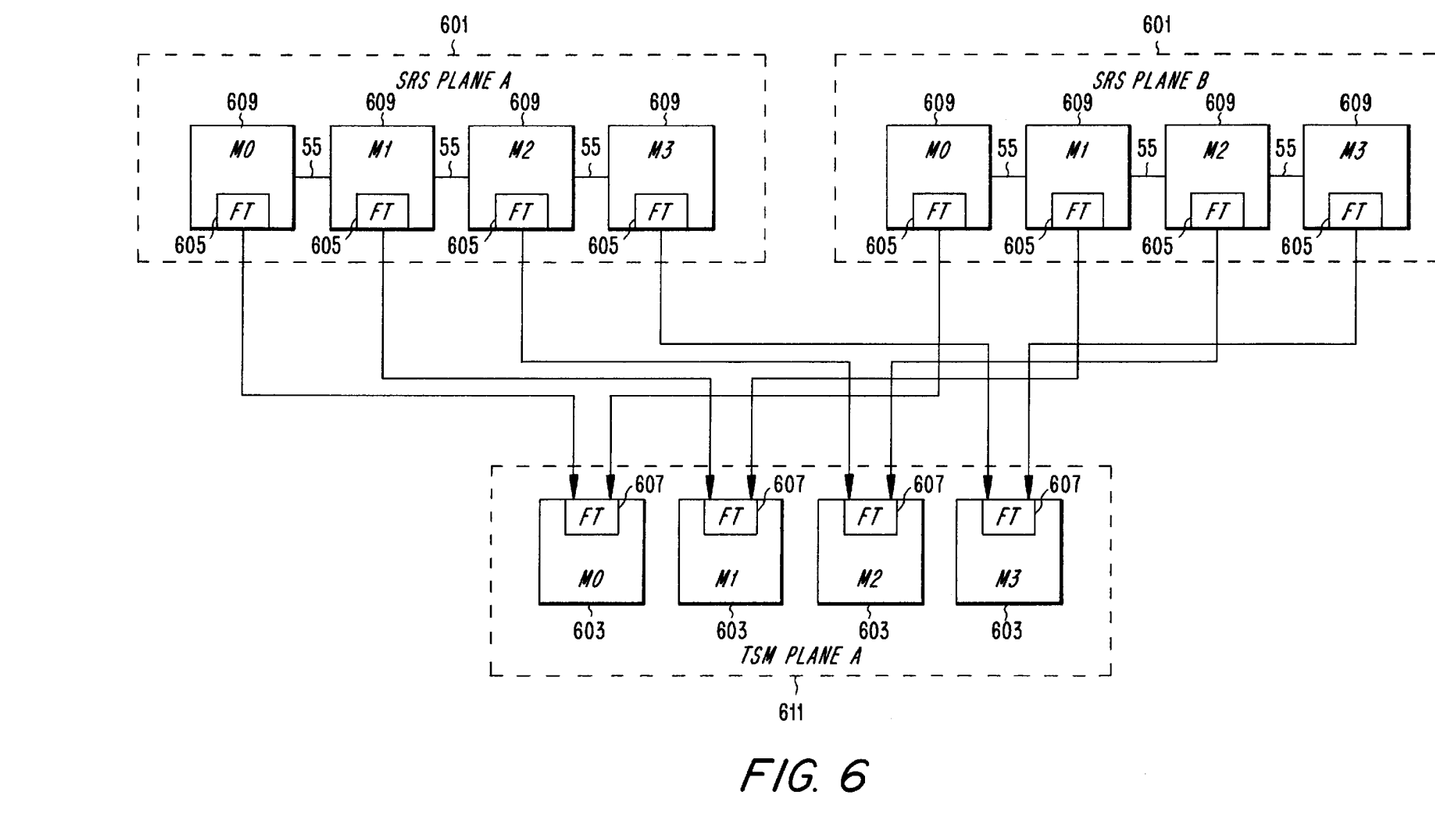
FIG. 6 is a block diagram of a double fault-tolerant switching system in accordance with one aspect of the invention.

Referring now to FIG. 6, redundant SRS planes 601 are shown connected to a TSM plane 611. As in the discussion above, only one TSM plane 611 is depicted for the sake of simplicity of discussion. However, it will be recognized that in practice, redundant TSM planes 611 may be present. Furthermore, while only four subrate switching modules 609, designated M0 ... M3, are depicted in each SRS plane 601, in practice the SRS plane 601 may include fewer or more subrate switching modules 609, each outputting a series of time slots to corresponding TSMs 603 in the TSM plane 611.

As shown in FIG. 6, each of the TSM's 603 has physical connections enabling it to receive output time slots from a corresponding subrate switching module 609 in each of the redundant SRS planes 601. In one embodiment, each SRS module 609 includes fault tolerant (FT) hardware 605 that works in conjunction with FT hardware 607 located in each TSM 603 of the TSM plane 611. In one aspect of the invention, the SRS FT hardware 605 ensures that each non-faulty subrate switching module 609 (e.g., SRS module M0) sets to zero any output time slot bits that were received from a faulty subrate switching module 609 (e.g., SRS module M1). (Refer back to FIG. 4 to see, by analogy with the subrate switching modules 60, how each subrate switching module 609 in an SRS plane 601 receives some of its input data from each of the other subrate switching modules 609 by means of the internal connections 55.) In this case, the output time slot from the subrate switching module 609 is considered invalid, even though the module itself may not be faulty, and the time slot may include valid bits from normally functioning (i.e., not faulty) subrate switching modules 609. The SRS FT hardware 605 further generates status signals to indicate whether the subrate switching module itself is faulty, and whether its output time slot is invalid. The purpose of these operations will become apparent in the following discussion.

The TSM's FT hardware 607 generates appropriate control signals for causing the selection of data sources as a function of the following two conditions: 1) whether a particular SRS module 609 is faulty or blocked (meaning that it cannot, itself, generate a valid output time slot), and 2) whether the output time slot from a particular SRS module 609 includes bits from another subrate switching module 609 that is faulty or blocked. A faulty module is one that has a hardware or software fault. A blocked module is one that does not have a hardware or software fault, but that, nonetheless, is not generating a valid output time slot. This may be due to its being taken off-line for the purpose of performing routine maintenance or upgrading, for example. Throughout this disclosure, references to "faulty" modules and the like should be construed to also include cases involving "blocked" modules.

Let the first condition be represented by the variables $MFlt_A$ for plane A, and $MFlt_B$ for plane B, where $MFlt_x=0$ means that the corresponding subrate switching module 609 in plane X is not faulty, and $MFlt_x=1$ means that it is faulty. Further, let the second condition be represented by the variables $MValid_A$ for plane A, and $MValid_B$ for plane B, where $MValid_x=0$ means that the output time slot from the subrate switching module 609 in plane X includes bits received from one or more faulty subrate switching modules 609 in plane X, and $MValid_x=1$ means that the output time slot from the subrate switching module 609 in plane X includes bits received only from fully functioning subrate switching modules 609 in plane X. In accordance with another aspect of the invention, the TSM FT hardware 607 generates control signals to cause a corresponding TSM 603 to select its inputs as shown in the following Table 1:

TABLE 1

| $MFlt_B$ | $MFlt_A$ | $MValid_B$ | $MValid_A$ | Select Time Slot From Plane: |
|---|---|---|---|---|
| 0 | 0 | 0 | 0 | Plane A OR'ed with Plane B |
| 0 | 0 | 0 | 1 | Plane A |
| 0 | 0 | 1 | 0 | Plane B |
| 0 | 0 | 1 | 1 | Plane A |
| 0 | 1 | 0 | 0 | Plane B (Invalid) |
| 0 | 1 | 0 | 1 | Plane B (Invalid) |
| 0 | 1 | 1 | 0 | Plane B |
| 0 | 1 | 1 | 1 | Plane B |
| 1 | 0 | 0 | 0 | Plane A (Invalid) |
| 1 | 0 | 0 | 1 | Plane A |
| 1 | 0 | 1 | 0 | Plane A (Invalid) |
| 1 | 0 | 1 | 1 | Plane A |
| 1 | 1 | 0 | 0 | [Both planes faulty] |
| 1 | 1 | 0 | 1 | [Both planes faulty] |
| 1 | 1 | 1 | 0 | [Both planes faulty] |
| 1 | 1 | 1 | 1 | [Both planes faulty] |

It would appear that a number of states (i.e., 1x1x and x1x1, where "x" indicates a "don't care" bit) can't occur, because they define a contradictory situation in which a subrate switching module 609 is faulty, but its output time slot is valid. However in practice, the fact that a subrate switching module 609 is faulty means that its corresponding $MValid_x$ bit may itself be invalid, so the indication that valid data is available from a faulty switching module 609 is not to be trusted. Consequently, in these instances the Time Slot is selected from the remaining non-faulty plane. State 1000 is also interesting because it refers to a situation in which only the subrate switching module 609 in plane A is not faulty, but its output is invalid. The rule in this case is to select the time slot from the subrate switching module 609 in plane A, despite its known error, because at least some of the bits may be correct. A similar rule is applied to state 0100, in which only the subrate switching module 609 in plane B is not faulty, but its output is invalid. As to state 1100, it refers to the case in which the SRS modules 609 in both planes A and B are faulty. In this case, it does not matter which plane is selected, since neither will generate a valid output time slot.

Looking at the remaining states, it can be seen from Table 1 that whenever the output time slot from plane A is valid, it is selected as the source of a time slot to be received by the corresponding TSM 603. Also, if the output time slot from plane A is invalid and the output time slot from plane B is valid, then the output time slot from plane B is selected as the source of a time slot to be received by the corresponding TSM 603. These two rules are quite logical, and should not require further explanation other than to say that the selection of the time slot from plane A as the preferred plane whenever time slots from both planes A and B are valid is completely arbitrary, and could easily have been made the other way.

Turning now to state 0000, this indicates the case in which the subrate switching modules 609 in both planes A and B are operating without fault, but in which neither module is generating a valid output time slot (because each is utilizing one or more bits received from one or more faulty subrate switching modules 609 within the same plane). As indicated in the Table, the rule here is to perform a logical OR between the time slot received from plane A and the time slot received from plane B. Because the SRSM FT hardware 605 ensures that each non-faulty subrate switching module 609 sets to zero any output time slot bits that were received from a faulty subrate switching module 609, the OR'ing together of the output time slots from the two planes increases the likelihood that a valid time slot will be generated.

Figure 7:
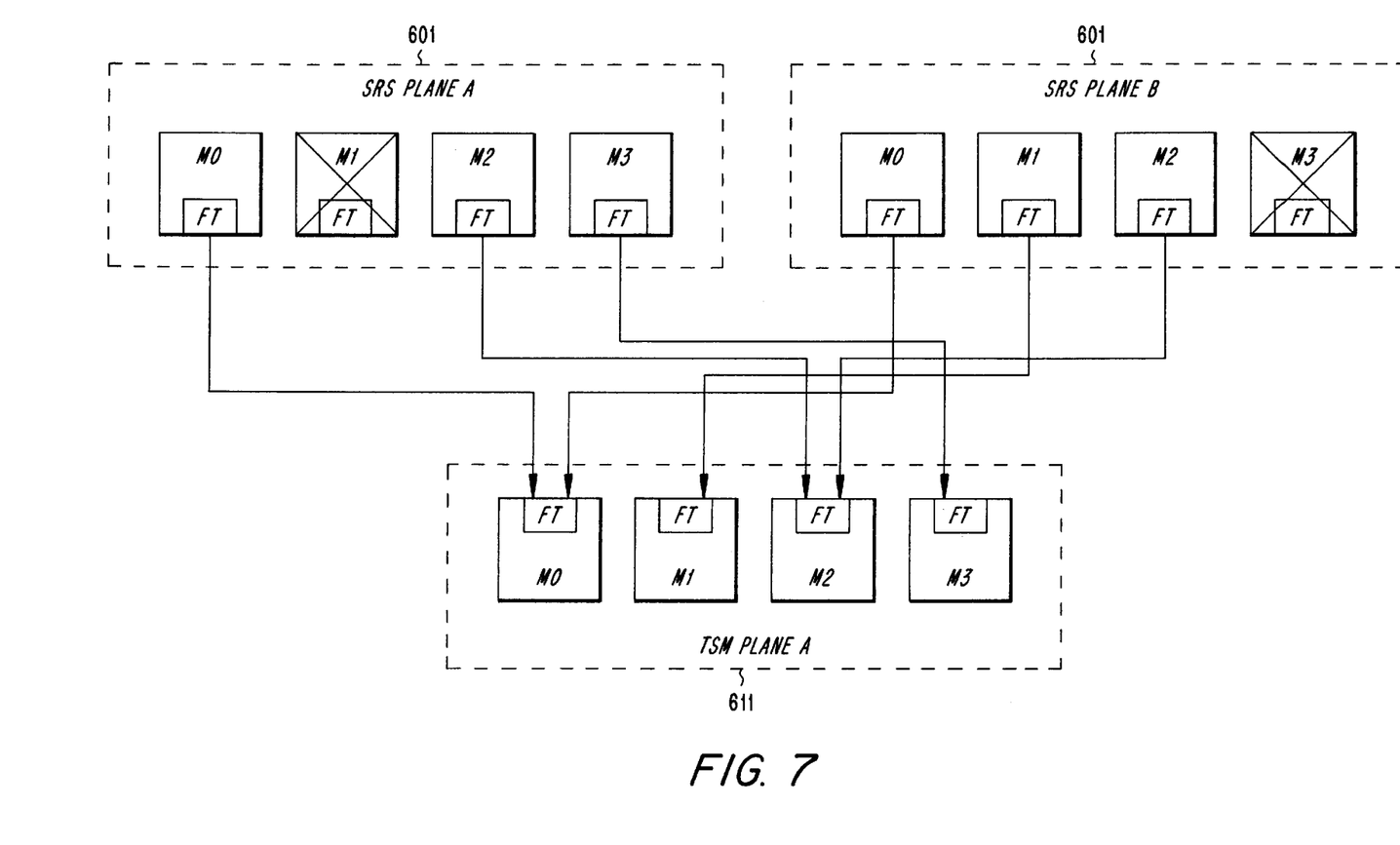
FIG. 7 illustrates a solution for handling errors that occur in redundant switching planes in accordance with one aspect of the invention.

For example, consider the situation depicted in FIG. 7. The subrate switching module M1 in SRS plane A is faulty, as is the subrate switching module M3 located in the SRS plane B. Therefore, in neither SRS plane A nor SRS plane B is it possible for traffic to flow between subrate switching modules M1 and M3. Assume that the output time slot from M0 in both SRS planes A and B is supposed to include data bits received from the faulty M1 and M3 subrate switching modules. In this case, in plane A, M0's FT hardware 605 will cause those bit positions corresponding to the faulty M1 subrate switching module to have binary zero's in them. Similarly, in plane B, M0's FT hardware 605 will cause those bit positions in the output time slot corresponding to the faulty M3 subrate switching module to have binary zero's in them. As a consequence, when the TSM FT hardware 607 logically OR's these two time slots together, a valid time slot is generated that can be presented to the TSM designated M0. This is schematically depicted in FIG. 7 by the indication that TSM module M0 in TSM plane A 611 receives input from the M0 subrate switching modules located in both SRS plane A and SRS plane B. If subrate switching module M2 also receives data from subrate switching modules M1 and M3, the module M2 in TSM plane A 611 also receives the logical OR of the inputs from the M2 subrate switching modules located in both SRS plane A and SRS plane B, as depicted in FIG. 7.

FIG. 7 also shows that, because the subrate switching module M1 is faulty in plane A, the TSM designated M1 receives the output time slot only from the non-faulty subrate switching module M1 in plane B. Similarly, because the subrate switching module M3 in plane A is not faulty, it alone supplies an output time slot to the TSM designated M3.

It can be seen that performance in the double fault situation is improved by means of the above-described techniques. Another advantage is that the blocking probability of new connections can also be reduced considerably. The only restriction is for traffic between the blocked modules.

Furthermore, the performance of routine maintenance or upgrading of a subrate switching module 609 can be performed without requiring that the entire associated SRS plane 601 be disabled as well.

Figure 8:
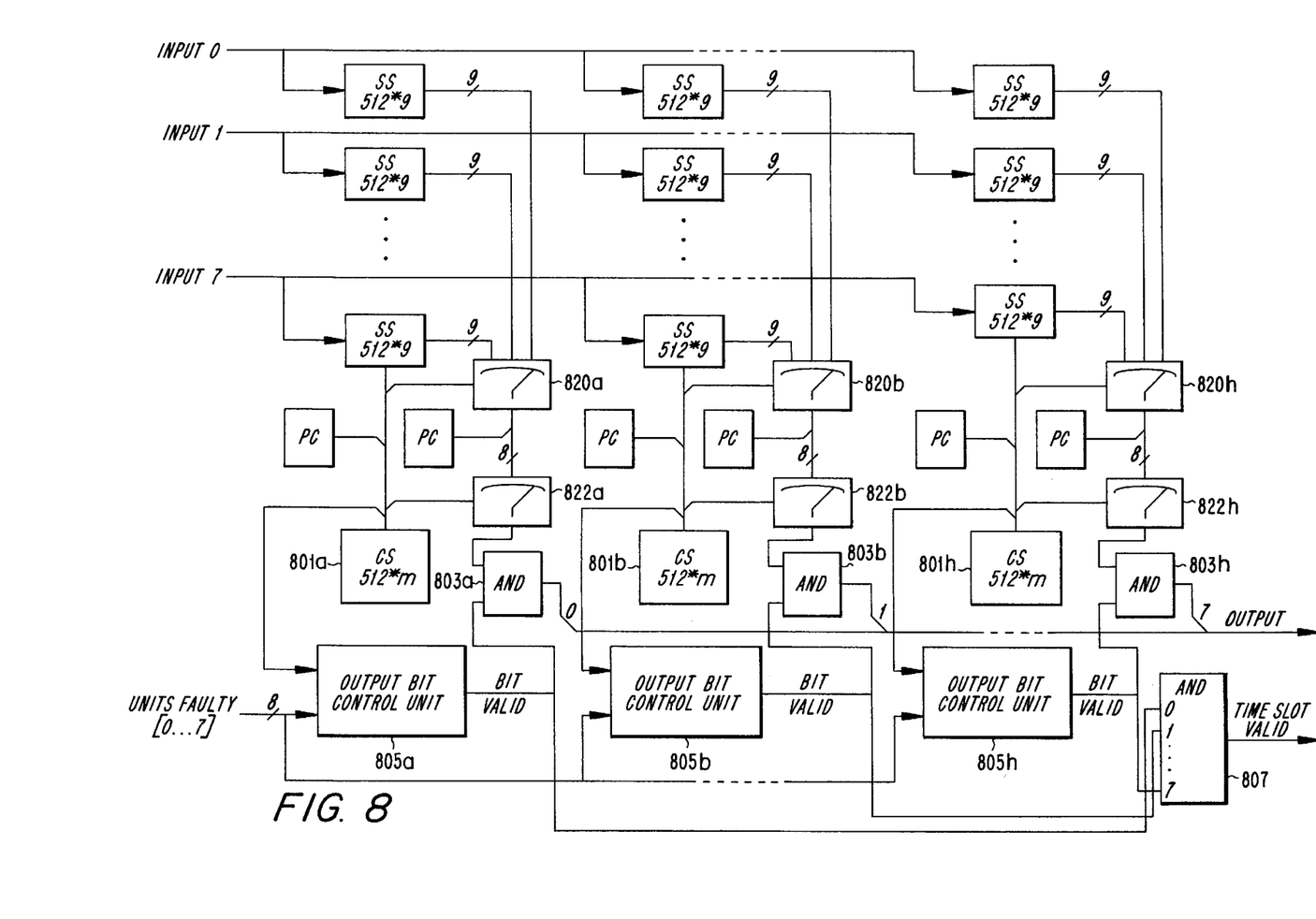
FIG. 8 is a block diagram of the logical structure of one exemplary subrate switching module, less any selectors and drivers for supplying an input time slot frame, in accordance with one aspect of the invention.

An exemplary embodiment of the invention will now be described in greater detail with reference to FIGS. 8 and 9. Referring first to FIG. 8, this shows a block diagram of the logical structure of one exemplary subrate switching module 609 (refer to FIG. 6), less any selectors 51 and drivers 50 (refer to FIG. 4) for supplying an input time slot frame. The exemplary subrate switching module 609 depicted here is designed for use in an SRS plane 601 having as many as eight subrate switching modules 609 (numbered 0 . . . 7). However, the design is easily scalable for use with fewer or more than eight subrate switching modules 609.

The exemplary subrate switching module 609 includes eight TDM input buses 0–7 which may each include, for example, consecutive 512 time slot frames to produce a data rate of 4.096 Mbps. There are eight columns of switch stores (SS) with each column corresponding to one bit of the 8-bit output time slot. Each switch store may be, for example, a random access memory (RAM) having a word width of 9-bits and a length of 512 words. Eight of the bits correspond to one time slot of information to be switched, and the ninth bit corresponds to a parity bit for error checking. Accordingly, each switch store memory is able to store one frame of time slot information at a time. In addition, the same frame information from each input bus is simultaneously stored in each of the eight switch store memories in that row. Thus, in one column there are as many switch store memories as the number of input ports. Each switch store memory stores a frame of data incoming at the corresponding input port, and in this way, all incoming data are available in a column for switching. Since one column corresponds to a specific bit position in one output port, it is used to switch at that specified bit position any input bit coming from any input port. FIG. 8 illustrates eight columns in the switch matrix to show an example of subrate switching from eight input ports to one output port. This structure would therefore be replicated eight times to effect subrate switching from eight input ports to eight output ports.

A control store memory (CS) 801a . . . 801h is provided for each of the eight columns. Like the switch store SS, the CS 801a . . . 801h may be a RAM memory for storing 512*m bit wide control words. The width of each word in a CS 801a . . . 801h is the sum of the bits used for the following: a switch store address, an address for a first set of time slot selectors 820a . . . 820h, an address for a second set of bit selectors 822a . . . 822h, a "busy" bit that indicates whether a bit is being selected from this column (if "busy" is not set, then it is unnecessary to perform a speech store read operation), and parity. The switch store address, in this example, includes 9 bits in order to select one of the 512 time slot words stored in each switch store. The address for the time slot selectors 820a . . . 820h includes 3 bits to select one of the eight switch stores in the column. The address of the bit selector would include 3 bits to select one of the eight bits of the 8-bit time slots selected by the time slot selector for that column. Parity typically includes one bit. Accordingly, the width of the control store word in the example matrix shown in FIG. 8 (i.e., the number of bits utilized for representing a switch store address, an address for the first set of time slot selectors 820a . . . 820h, an address for the second set of bit selectors 822a . . . 822h, the "busy" bit, and parity) may be 17-bits. However, an additional bit may be added to each control store location to mark semi-permanent connections as opposed to on-demand connections. The parity checkers (PC) perform parity checking functions on the time slot data. Each control store is addressed using an output from a time slot counter (not shown).

In the logical structure of the subrate switching module of FIG. 8, each one of the eight columns produces one bit of the 8-bit output. The eight switch stores in each column and following time slot selector 820 (which may be a multiplexer, or alternatively a bus) supply one complete time slot from one of the input ports. The second selector 822 (which may also be a multiplexer) selects one bit from this selected time slot. For each bit of each outgoing time slot, the subrate switch therefore has one location in the CS 801. The contents of that control store location define a specific bit in a particular switch store which should be read. In this way, the subrate switching module is able to switch in both time (the switch stores) and space (the selectors 820 and 822) individual bits from one subchannel multiplexed onto one normal rate time slot to another subrate channel in a completely different normal rate time slot. Thus, the subrate switching module employs a time-space (TS) switch architecture. The TS switch is strictly non-blocking.

In addition to the components described above, each of the eight columns includes components associated with the SRS FT hardware 605. In particular, each column includes an AND gate 803, and an output bit control unit 805. One input of the AND gate 803 receives the output of the second selector 822. The other input of the AND gate 803 receives a signal supplied by the output bit control unit 805. The output bit control unit 805 receives signals, generated by fault detection logic (not shown) indicating the status ("not faulty" or "faulty") of each of the eight subrate switching modules 609. The output bit control unit 805 additionally monitors the output data generated by the CS 801. If the output data indicates that the selected bit is to come from a switch store associated with a faulty subrate switching module 609, then the output bit control unit 805 generates a "0" output signal, indicating that the selected bit is not valid. In all other cases, the output bit control unit 805 generates a "1" output signal, indicating that the selected bit is valid. In this way, the output bit control unit 805 may allow the selected bit to pass through the AND gate 803 when the bit is valid, and may force the output of the AND gate 803 to a binary zero whenever the selected bit comes from a faulty module 609.

The SRS FT hardware 605 further includes an AND gate 807 that receives each of the individual outputs from the output bit control units 805a . . . 805h. The output of the AND gate 807 is a signal that, when asserted (=1) indicates that the output time slot from this subrate switching module 609 is valid.

Consider the following example. Assume that the subrate channel to be switched is a 16 kbps subrate channel, that is, it occupies two 8 kbps subrate channels. To switch the 16 kbps channel from bit positions 0 and 1 in a time slot at location 220 in the frame at input port 5 to bit positions 2 and 3 in a time slot location 300 at output port 3, the control store controlling bit position 2 at output port 3 must address in correspondence with output location 300 the bit position zero in memory location 220 at input port 5. The control store controlling bit position 3 at output port 3 must address in correspondence with output location 300 the bit position 1 in memory location 220 at input port 5. Assuming that these bits are not supplied by a faulty subrate switching module 609, the corresponding output bit control units 805 will permit these bits to pass through the corresponding AND gates 803.

Figure 9:
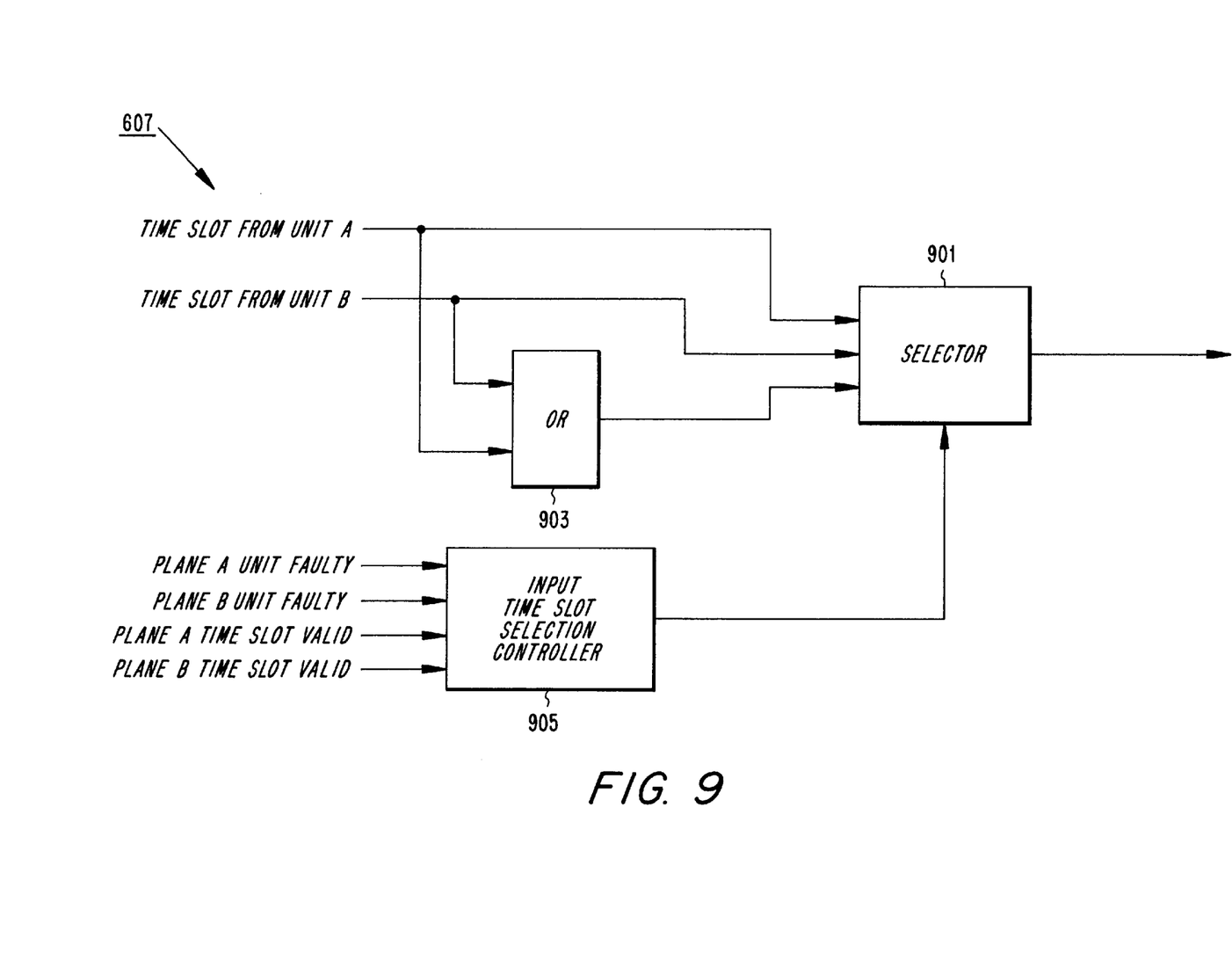
FIG. 9 is a block diagram of an exemplary embodiment of TSM FT hardware in accordance with one aspect of the invention.

Referring now to FIG. 9, this is a block diagram of an exemplary embodiment of the TSM FT hardware 607 that is replicated for each TSM 603. The exemplary FT hardware 607 receives the output time slots from a corresponding subrate switching module 609 located from each of the redundant SRS planes, in this case, planes A and B. Each of the received time slots is supplied directly to a respective input of a selector 901, and also to a respective input of a bit-wise OR gate 903. The output of the OR gate 903 is supplied to another input of the selector 901.

The exemplary FT hardware 607 further includes an input time slot selection controller 905, which generates a selection control signal that is supplied to the selector 901. Supplied to the input time slot selection controller 905 are signals respectively indicating whether the subrate switching modules on plane A and/or plane B are faulty. The input time slot selection controller 905 also receives signals respectively indicating whether the subrate switching modules on plane A and/or plane B are supplying valid time slots. The input time slot selection controller 905 uses these received signal to generate a selection control signal in accordance with the rules indicated by Table 1, above.

The invention has been described with reference to a particular embodiment. However, it will be readily apparent to those skilled in the art that it is possible to embody the invention in specific forms other than those of the preferred embodiment described above. This may be done without departing from the spirit of the invention. For example, exemplary TSM FT hardware 607 has been described that makes selections in accordance with the rules set forth in Table 1, above. However, those having ordinary skill in the art will recognize that alternative rules could be used (e.g., preference can be given to time slots received from plane B instead of from plane A in those cases in which valid time slots may be received from either of these). Furthermore, it is possible to realize the inventive concepts without using the selector 901 or the input time slot selection controller 905, by simply setting bits from faulty subrate switching modules to zero and performing a bit-wise OR operation for all time slots (i.e., always select the output from the OR gate 903 illustrated in FIG. 9.) This alternative has an advantage in that it utilizes less hardware. A drawback of this alternative is the fact that any control software in such a switching system is deprived of the ability to make decisions concerning fault recovery.

Also, the invention has been described with reference to an exemplary embodiment involving subrate switching on a bit-by-bit basis. However, it will be readily apparent that the inventive concepts (e.g., in a switching module, zeroing out bits that are received from other faulty modules; and, in an apparatus that receives the outputs from redundant switching modules, logically OR'ing the outputs from two or more redundant switching modules when it is detected that they are all generating invalid outputs) may be applied to redundant subrate switching on a multiple bit-by multiple bit basis, or even to redundant normal rate switching. In such cases, the "zeroing out" and logical OR'ing steps would likewise be applied to whatever size data units are being switched.

In still other alternative embodiments, the "zeroing out" step is replaced by a "setting step" (i.e., an output time slot bit-position designated to receive a bit from a faulty module is forced to a binary one) used in conjunction with logical AND'ing of these bit positions in the TSM 603.

In yet other alternatives, the inventive concepts can be applied generally to any system that includes redundant planes of processing modules, where the output of each module may be a function of data received from a faulty module in the same processing plane; the modules need not be switching modules as described above with reference to the exemplary embodiment.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating each of a plurality of processing modules in an apparatus for processing a plurality of input signals, wherein the apparatus comprises redundant processing planes, wherein each processing plane is for processing the plurality of input signals, and each processing plane includes at least two of the processing modules, each processing module being connected to receive a subset of the input signals directly from an input signal source coupled to the apparatus and each processing module being further connected to receive a remaining subset of the input signals from remaining processing modules on the same processing plane; and wherein each processing module generates an output signal comprising components derived from the plurality of input signals, the method comprising the steps of:

detecting whether any of the remaining processing modules on the same processing plane are faulty; and     in response to detection of a faulty processing module in the same processing plane, substituting a signal representing a logical zero for those components of the output signal that are derived from the faulty processing module.

2. The method of claim 1, wherein each processing module is a switching module.

3. The method of claim 1, wherein each processing module is a subrate switching module.

4. The method of claim 3, wherein subrate switching is performed on a bit-by-bit basis.

5. The method of claim 1, wherein each processing module is a normal rate switching module that switches data units comprising more than one bit.

6. The method of claim 1, further comprising the step of generating a signal indicating that at least one component of the output signal is derived from one or more faulty processing modules.

7. A method of processing a plurality of input signals in an apparatus comprising redundant processing planes and means for receiving an output signal from each of the redundant processing planes, wherein each processing plane is for processing the plurality of input signals, and each processing plane includes at least two processing modules, each processing module being connected to receive a subset of the input signals directly from an input signal source coupled to the apparatus and each processing module being further connected to receive a remaining subset of the input signals from remaining processing modules on the same processing plane; and wherein each processing module generates an output signal comprising components derived from the plurality of input signals, the method comprising the steps of:

in each processing module, detecting whether any of the remaining processing modules on the same processing plane are faulty;

in response to detection of a faulty processing module in the same processing plane, substituting a signal representing a logical zero for those components of the output signal that are derived from the faulty processing module; and in the means for receiving the output signal from each of the redundant processing planes, logically OR'ing the received output signals together.

8. The method of claim 7, further comprising the step of:

in the means for receiving the output signal from each of the redundant processing planes, detecting that each of the output signals received from corresponding processing modules in the redundant processing planes is invalid; and wherein the step of logically OR'ing the received output signals together is performed in response to detecting that each of the received output signals is invalid.

9. The method of claim 7, wherein each processing module is a switching module.

10. The method of claim 7, wherein each processing module is a subrate switching module.

11. The method of claim 10, wherein subrate switching is performed on a bit-by-bit basis.

12. The method of claim 7, wherein each processing module is a normal rate switching module that switches data units comprising more than one bit.

13. The method of claim 7, further comprising the steps of:

in the means for receiving the output signal from each of the redundant processing planes, detecting that one of two redundant processing modules is faulty, and in response to said detection, selecting for further processing only the output signal from a non-faulty one of the two redundant processing modules.

14. The method of claim 7, further comprising the step of, in each processing module, generating a signal indicating that at least one component of the output signal is derived from one or more faulty processing modules.

15. A method of operating each of a plurality of processing modules in an apparatus for processing a plurality of input signals, wherein the apparatus comprises redundant processing planes, wherein each processing plane is for processing the plurality of input signals, and each processing plane includes at least two of the processing modules, each processing module being connected to receive a subset of the input signals directly from an input signal source coupled to the apparatus and each processing module being further connected to receive a remaining subset of the input signals from remaining processing modules on the same processing plane; and wherein each processing module generates an output signal comprising components derived from the plurality of input signals, the method comprising the steps of:

detecting whether any of the remaining processing modules on the same processing plane are faulty; and in response to detection of a faulty processing module in the same processing plane, substituting a signal representing a logical one for those components of the output signal that are derived from the faulty processing module.

16. The method of claim 15, wherein each processing module is a switching module.

17. The method of claim 15, wherein each processing module is a subrate switching module.

18. The method of claim 17, wherein subrate switching is performed on a bit-by-bit basis.

19. The method of claim 15, wherein each processing module is a normal rate switching module that switches data units comprising more than one bit.

20. The method of claim 15, further comprising the step of generating a signal indicating that at least one component of the output signal is derived from one or more faulty processing modules.

21. A method of processing a plurality of input signals in an apparatus comprising redundant processing planes and means for receiving an output signal from each of the redundant processing planes, wherein each processing plane is for processing the plurality of input signals, and each processing plane includes at least two processing modules, each processing module being connected to receive a subset of the input signals directly from an input signal source coupled to the apparatus and each processing module being further connected to receive a remaining subset of the input signals from remaining processing modules on the same processing plane; and wherein each processing module generates an output signal comprising components derived from the plurality of input signals, the method comprising the steps of:

in each processing module, detecting whether any of the remaining processing modules on the same processing plane are faulty;

in response to detection of a faulty processing module in the same processing plane, substituting a signal representing a logical one for those components of the output signal that are derived from the faulty processing module; and in the means for receiving the output signal from each of the redundant processing planes, logically AND'ing the received output signals together.

22. The method of claim 21, further comprising the step of:

in the means for receiving the output signal from each of the redundant processing planes, detecting that each of the output signals received from corresponding processing modules in the redundant processing planes is invalid; and wherein the step of logically AND'ing the received output signals together is performed in response to detecting that each of the received output signals is invalid.

23. The method of claim 21, wherein each processing module is a switching module.

24. The method of claim 21, wherein each processing module is a subrate switching module.

25. The method of claim 24, wherein subrate switching is performed on a bit-by-bit basis.

26. The method of claim 21, wherein each processing module is a normal rate switching module that switches data units comprising more than one bit.

27. The method of claim 21, further comprising the steps of:
in the means for receiving the output signal from each of the redundant processing planes, detecting that one of two redundant processing modules is faulty, and in response to said detection, selecting for further processing only the output signal from a non-faulty one of the two redundant processing modules.

28. The method of claim 21, further comprising the step of, in each processing module, generating a signal indicating that at least one component of the output signal is derived from one or more faulty processing modules.

29. A processing module for use with a plurality of like processing modules in an apparatus for processing a plurality of input signals, wherein the apparatus comprises redundant processing planes, wherein each processing plane is for processing the plurality of input signals, and each processing plane includes at least two of the processing modules, the processing module comprising:
means for receiving a subset of the input signals directly from an input signal source coupled to the apparatus;
means for receiving a remaining subset of the input signals from remaining processing modules on the same processing plane;
means for generating an output signal comprising components derived from the plurality of input signals;
means for detecting whether any of the remaining processing modules on the same processing plane are faulty; and
means, responsive to a detection that at least one of the remaining processing modules on the same processing plane is faulty, for substituting a signal representing a logical zero for those components of the output signal that are derived from the faulty processing module.

30. The processing module of claim 29, wherein each processing module is a switching module.

31. The processing module of claim 29, wherein each processing module is a subrate switching module.

32. The processing module of claim 31, wherein each subrate switching module performs switching on a bit-by-bit basis.

33. The processing module of claim 29, wherein each processing module is a normal rate switching module that switches data units comprising more than one bit.

34. The processing module of claim 29, further comprising means for generating a signal indicating that at least one component of the output signal is derived from one or more faulty processing modules.

35. An apparatus for processing a plurality of input signals, comprising:
redundant processing planes, wherein each processing plane is for processing the plurality of input signals, and each processing plane includes at least two processing modules, each processing module including:
means for receiving a subset of the input signals directly from an input signal source coupled to the apparatus;
means for receiving a remaining subset of the input signals from remaining processing modules on the same processing plane;
means for generating an output signal comprising components derived from the plurality of input signals;
means for detecting whether any of the remaining processing modules on the same processing plane are faulty; and
means, responsive to detection of a faulty processing module in the same processing plane, for substituting a signal representing a logical zero for those components of the output signal that are derived from the faulty processing module; and
means for receiving an output signal from each of the redundant processing planes, including:
means for logically OR'ing the received output signals together.

36. The apparatus of claim 35, wherein the means for receiving the output signal from each of the redundant processing planes further comprises means for detecting that each of the output signals received from corresponding processing modules in the redundant processing planes is invalid; and
wherein the means for logically OR'ing the received output signals together operates in response to a detection that each of the received output signals is invalid.

37. The apparatus of claim 35, wherein each processing module is a switching module.

38. The apparatus of claim 35, wherein each processing module is a subrate switching module.

39. The apparatus of claim 38, wherein each subrate switching module performs subrate switching on a bit-by-bit basis.

40. The apparatus of claim 35, wherein each processing module is a normal rate switching module that switches data units comprising more than one bit.

41. The apparatus of claim 35, further comprising:
in the means for receiving the output signal from each of the redundant processing planes, means for detecting that one of two redundant processing modules is faulty; and
means, responsive to a detection that one of two redundant processing modules is faulty, for selecting for further processing only the output signal from a non-faulty one of the two redundant processing modules.

42. The apparatus of claim 35, further comprising, in each processing module, means for generating a signal indicating that at least one component of the output signal is derived from one or more faulty processing modules.

43. A processing module for use with a plurality of like processing modules in an apparatus for processing a plurality of input signals, wherein the apparatus comprises redundant processing planes, wherein each processing plane is for processing the plurality of input signals, and each processing plane includes at least two of the processing modules, the processing module comprising:
means for receiving a subset of the input signals directly from an input signal source coupled to the apparatus;
means for receiving a remaining subset of the input signals from remaining processing modules on the same processing plane;
means for generating an output signal comprising components derived from the plurality of input signals;
means for detecting whether any of the remaining processing modules on the same processing plane are faulty; and
means, responsive to a detection that at least one of the remaining processing modules on the same processing plane is faulty, for substituting a signal representing a logical one for those components of the output signal that are derived from the faulty processing module.

44. The processing module of claim 43, wherein each processing module is a switching module.

45. The processing module of claim 43, wherein each processing module is a subrate switching module.

46. The processing module of claim 45, wherein each subrate switching module performs switching on a bit-by-bit basis.

47. The processing module of claim 43, wherein each processing module is a normal rate switching module that switches data units comprising more than one bit.

48. The processing module of claim 43, further comprising means for generating a signal indicating that at least one component of the output signal is derived from one or more faulty processing modules.

49. An apparatus for processing a plurality of input signals, comprising:
   redundant processing planes, wherein each processing plane is for processing the plurality of input signals, and each processing plane includes at least two processing modules, each processing module including:
      means for receiving a subset of the input signals directly from an input signal source coupled to the apparatus;
      means for receiving a remaining subset of the input signals from remaining processing modules on the same processing plane;
      means for generating an output signal comprising components derived from the plurality of input signals;
      means for detecting whether any of the remaining processing modules on the same processing plane are faulty; and
      means, responsive to detection of a faulty processing module in the same processing plane, for substituting a signal representing a logical one for those components of the output signal that are derived from the faulty processing module; and
   means for receiving an output signal from each of the redundant processing planes, including:
      means for logically AND'ing the received output signals together.

50. The apparatus of claim 49, wherein the means for receiving an output signal from each of the redundant processing planes further includes means for detecting that each of the output signals received from corresponding processing modules in the redundant processing planes is invalid; and
   wherein the means for logically AND'ing the received output signals together operates in response to a detection that each of the received output signals is invalid.

51. The apparatus of claim 49, wherein each processing module is a switching module.

52. The apparatus of claim 49, wherein each processing module is a subrate switching module.

53. The apparatus of claim 52, wherein each subrate switching module performs subrate switching on a bit-by-bit basis.

54. The apparatus of claim 49, wherein each processing module is a normal rate switching module that switches data units comprising more than one bit.

55. The apparatus of claim 49, further comprising:
   in the means for receiving the output signal from each of the redundant processing planes, means for detecting that one of two redundant processing modules is faulty; and
   means, responsive to a detection that one of two redundant processing modules is faulty, for selecting for further processing only the output signal from a non-faulty one of the two redundant processing modules.

56. The apparatus of claim 49, further comprising, in each processing module, means for generating a signal indicating that at least one component of the output signal is derived from one or more faulty processing modules.

* * * * *